United States Patent [19]

Hsieh

[11] 4,020,251

[45] Apr. 26, 1977

[54] 1,3-CYCLODIENE-ACYCLIC CONJUGATED DIENE COPOLYMERS

[75] Inventor: Henry L. Hsieh, Bartlesville, Okla.

[73] Assignee: Phillips Petroleum Company, Bartlesville, Okla.

[22] Filed: Mar. 17, 1975

[21] Appl. No.: 559,197

Related U.S. Application Data

[63] Continuation-in-part of Ser. No. 446,426, Feb. 27, 1974, abandoned.

[52] U.S. Cl. .................. 526/20; 260/879; 260/880 B; 526/25; 526/26; 526/173; 526/180; 526/181; 526/308

[51] Int. Cl.² ............ C08F 4/08; C08F 8/04; C08F 232/06

[58] Field of Search ........... 260/80.7, 82.1, 681.5; 450/685, 685.5, 744; 526/173, 181, 308, 20, 25, 26, 180

[56] References Cited

UNITED STATES PATENTS

| | | | |
|---|---|---|---|
| 2,352,979 | 7/1944 | Soday | 260/23 |
| 2,965,625 | 12/1960 | Anderson et al. | 260/94.3 |
| 2,999,088 | 9/1961 | Fraser et al. | 260/94.3 |
| 3,105,828 | 10/1963 | Porter | 260/83.7 |
| 3,389,128 | 6/1968 | Bayer et al. | 260/93.1 |
| 3,598,886 | 8/1971 | Hoeg et al. | 260/879 R |
| 3,629,213 | 12/1971 | Onishi et al. | 260/82.1 |
| 3,635,685 | 1/1971 | Sonnenfeld | 44/62 |
| 3,644,588 | 2/1972 | Hassell | 260/879 |
| 3,723,400 | 3/1973 | Dolgoplosk et al. | 260/82.1 |
| 3,740,382 | 6/1972 | Dolgoplosk et al. | 260/82.1 |

FOREIGN PATENTS OR APPLICATIONS

| | | | |
|---|---|---|---|
| 1,042,625 | 9/1966 | United Kingdom | 450/681.5 |
| 199,393 | 7/1967 | U.S.S.R. | 260/83.7 UX |
| 256,251 | 3/1970 | U.S.S.R. | 526/173 |

Primary Examiner—Stanford M. Levin

[57] ABSTRACT

A copolymer is produced by polymerization of a mixture comprising a 1,3-cyclodiene and an acyclic conjugated diene wherein a substantial percentage by weight of the acyclic conjugated diene units of the copolymer is in the trans and vinyl configurations. A method for producing the copolymer is provided employing an organolithium initiator. A hydrogenated copolymer and method of its production is also provided.

21 Claims, No Drawings

1,3-CYCLODIENE-ACYCLIC CONJUGATED DIENE COPOLYMERS

This application is a continuation-in-part of copending application Ser. No. 446,426, filed Feb. 27, 1974, now abandoned.

BACKGROUND

The invention relates to copolymers, both in the hydrogenated and unhydrogenated form, and methods of producing same.

Copolymers of 1,3-cyclodienes with acyclic conjugated dienes are disclosed in the prior art; however, they are a relatively new class of polymers and thus far their microstructure is predominantly cis-1,4, e.g., as much as 92–97 percent cis-1,4. By cis or trans as used herein is meant that the acyclic conjugated diene monomer is polymerized by 1,4-addition and has the cis or trans configuration respectively, and by vinyl as used herein is meant that the acyclic conjugated diene is polymerized by 1,2-addition and has the vinyl configuration. Generally, and without regard to vinyl content, the higher the cis content of a polymer derived from an acyclic conjugated diene monomer, the greater the rubbery character of the polymer, whereas the lower the cis content, the greater its resinous character. Due to the large number of articles fabricated, i.e., not chemical products, from resinous polymers in general, it is worthwhile to produce novel resinous 1,3-cyclodiene/acyclic conjugated diene copolymers.

An object of the invention is to produce copolymers.

A further object of the invention is to produce copolymers from 1,3-cyclodiene and acyclic conjugated diene monomers.

Still a further object of the invention is to produce resinous 1,3-cyclodiene/acyclic conjugated diene copolymers.

Yet another object of the invention is to produce hydrogenated copolymers.

A further object of the invention is to produce hydrogenated copolymers from 1,3-cyclodiene and acyclic conjugated diene monomers.

Further aspects, objects and advantages of the invention will become apparent to one skilled in the art upon studying the specification and appended claims.

SUMMARY

According to the invention there is provided a novel copolymer of an acyclic conjugated diene and a 1,3-cyclodiene wherein a substantial percentage by weight of the acyclic conjugated diene units of the copolymer is in the trans and vinyl configurations.

Further according to the invention a copolymer is produced by polymerizing an acyclic conjugated diene with a 1,3-cyclodiene in the presence of an organolithium initiator.

Further according to the invention there is provided a novel copolymer of an acyclic conjugated diene and a 1,3-cyclodiene wherein a substantial percentage by weight of the acyclic conjugated diene units of the copolymer is in the trans and vinyl configurations and at least a portion of the olefinic bonds of the copolymer are hydrogenated.

Further according to the invention a hydrogenated copolymer is produced by polymerizing a reaction mixture comprising an acyclic conjugated diene and a 1,3-cyclodiene in the presence of an organolithium initiator and hydrogenating at least a portion of the olefinic bond of the copolymer produced by said polymerization in the presence of a suitable catalyst.

Further according to the invention a hydrogenated copolymer is produced by passing an acyclic conjugated diene-1,3-cyclodiene copolymer produced in the presence of an organolithium initiator to a hydrogenation zone and hydrogenating at least a portion of the olefinic bonds of said copolymer in said zone in the presence of a suitable catalyst.

DETAILED DESCRIPTION 1,3-Cyclodienes suitable for use in the present invention are represented by the general formulas

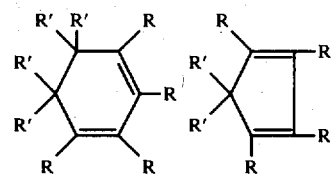

wherein R can be hydrogen, methyl or ethyl. The R groups can be the same or different. R' can be hydrogen, an alkyl group either straight or branched, or cycloalkyl or aryl such that the maximum number of carbon atoms per R' group is about 6. The R' groups can be the same or different. The total number of carbon atoms in the 1,3-cyclodiene monomer can range from 5 to about 20. Examples of such compounds include 1,3-cyclopentadiene, 2-methyl-1,3-cyclopentadiene, 5-ethyl-1,3-cyclopentadiene, 1,3-cyclohexadiene, 1-ethyl-1,3-cyclohexadiene, 1,4-dimethyl-5-isopropyl-1,3-cyclohexadiene, 2,3-dimethyl-5,6-diphenyl-1,3-cyclohexadiene, 2,3-diethyl-5-(n-butyl)-6-phenyl-1,3-cyclohexadiene and 1-methyl-5-cyclohexyl-1,3-cyclohexadiene.

Suitable acyclic conjugated dienes employed in the invention are those of 4 to 12, preferably 4 to 8, carbon atoms per molecule. Examples of these include 1,3-butadiene, isoprene, piperylene, 2-methyl-1,3-pentadiene, 2,3-dimethyl-1,3-butadiene, 1,3-octadiene and 5,6-diethyl-1,3-octadiene.

It is within the scope of the invention to include a vinylaromatic compound in the polymerization mixture along with the other monomers. The vinylaromatic compounds generally tend to increase the resinous character of the resulting copolymers, consequently whether to include a vinylaromatic compound depends to a large extent upon the properties desired in the resultant copolymer. The vinylaromatic compounds suitable for use in the invention range in carbon number from about 8 to 14 and include styrene and various alkylstyrenes such as 4-ethylstyrene, and such as 1-vinylnaphthalene.

It is also within the scope of this invention to employ mixtures of cyclodienes and/or mixtures of acyclic conjugated dienes and/or mixtures of vinylaromatic compounds.

The copolymers produced according to the invention are block copolymers whether or not a vinylaromatic compound is included in the monomer mixture. If a vinylaromatic compound is included in the monomer mixture, 1,3-cyclodiene acts as a randomizer for the vinylaromatic compound and then adds on as a block.

The weight ratios of the monomer units in the copolymer vary widely. The weight ratio of acyclic conjugated diene units to cyclodiene units is generally in the range of from about 99:1 to 1:99, more generally 95:5 to 40:60. The weight ratio of acyclic conjugated diene units to vinylaromatic compound units is generally in the range of from about 100:0 to 1:99, more generally 100:0 to 50:50. A substantial percentage by weight of the acyclic conjugated diene units of the copolymers is in the trans and vinyl configurations. Generally, the percentage of acyclic conjugated diene units in the trans and vinyl configurations is in the range of from about 9 to 99 percent by weight of the copolymer and, as indicated earlier, the lower the cis content, or said another way, the higher the trans and vinyl content, the greater the resinous character of the copolymer.

Various organolithium compounds are suitable as polymerization initiators in accordance with this invention. These compounds have the formula $R''Li_x$, wherein $R''$ is a hydrocarbon radical selected from the group consisting of aliphatic, cycloaliphatic and aromatic radicals and x is an integer of 1 to 4, inclusive. The $R''$ in the formula has a valence equal to the integer $x$ and generally contains from 1 to 20, inclusive, carbon atoms, although higher molecular weight compounds can be utilized. Examples of suitable organolithium compounds include methyllithium, isopropyllithium, n-butyllithium, t-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane 1,10-dilithiodecane, 1,20-dilithioeicosane, 1,4-dilithiocyclohexane, 1,4-dilithio-2-butene, 1,8-dilithio-3-decene, 1,3-bis(1-lithio-3-methylpentyl)benzene, 1,4-dilithiobenzene, 1,5-dilithionaphthalene, 1,2-dilithio-1,2-diphenyl ethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-trilithiodecane, 1,5,10,20-tetralithioeicosane, 1,2,3,5-tetralithiocyclohexane, and 1,2,3,5-tetralithio-4-hexylanthracene.

Other suitable organolithium initiators are the alpha-lithio multisubstituted dialkylbenzenes and corresponding oligomers such as those represented by the formula

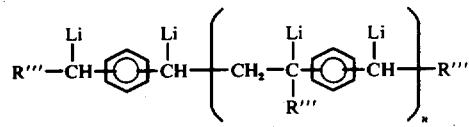

wherein $R'''$ is a linear or branched alkyl containing 2 to 12 carbon atoms, and n is an integer from 0 to 2. These compounds are usually used as a mixture in a suitable solvent; however, the mixture is primarily 1,3-bis-(1-lithio-3-methylpentyl)benzene referred to herein as DiLi-3. Additional information regarding such compounds can be found in U.S. Pat. No. 3,668,263, Morrison et al (1972) and U.S. Pat. No. 3,776,964, Morrison et al (1973).

The amount of initiator employed depends upon the polymer molecular weight desired and thus varies widely. Generally the amount of initiator is in the range of about 0.1–100 millimoles per 100 grams of total monomer. The multilithium initiators are preferred for use in synthesizing the inventive polymers. The use of such initiators promotes higher molecular weight and tougher polymers.

The polymerization process of this invention is usually carried out in the presence of a diluent. Diluents suitable for use in the process are hydrocarbons which are not detrimental to the polymerization process. Suitable diluents include paraffinic, cycloparaffinic and aromatic hydrocarbons and mixtures thereof. Suitable solvents include, for example n-heptane, 2,2,4-trimethylpentane, cyclohexane, benzene, toluene, and the xylenes. Cycloaliphatic hydrocarbons are preferred.

The inclusion, with the diluent of from about 0.01 to 50, preferably 0.1–10 parts by weight per 100 parts by weight monomer of an ether or a tertiary amine is preferred in order to increase the polymerization rate and to increase the degree of conversion. Suitable ethers include cyclic and acyclic ethers, for example, tetrahydrofuran, dioxane, dimethyl ether, diethyl ether, di-n-butyl ether, ethyl n-butyl ether, anisole, and diphenyl ether. Suitable tertiary amines include triethylamine, tri-n-propylamine, N,N-dimethylethylamine, N,N-dimethylaniline and N,N,N', N'-tetramethylethylenediamine.

The polymerization reaction can be carried out under autogenous pressure or at any suitable pressure sufficient to maintain the reaction mixture substantially in the liquid phase. The pressure will thus depend generally upon the particular diluent being employed and the temperature at which the polymerization is carried out. However, higher pressures can be employed if desired, these pressures being obtained by some suitable method such as pressurization of the reactor with a gas which is inert with respect to the polymerization reaction. The polymerization temperature can vary broadly but generally it is in the range of from about 0° to 300° F, preferably from about 30° to 150° F.

The time required for the polymerization is dependent upon such factors as the molecular weight desired, quantity of catalyst employed, temperature, and the like, but generally will range from a few minutes to as much as 48 hours, although longer polymerization periods can be employed. The process can be carried out batchwise or as a continuous process. The latter favors higher randomization. Various substances are known to be detrimental to the catalyst composition of this invention. These substances include carbon dioxide, oxygen and water. It is highly desirable, therefore, that the reactants be freed of these materials as well as any other materials which tend to inactivate the catalyst. Any of the known methods for removing such contaminants can be used. Also, when a diluent is employed in the process, it is preferred that this material be substantially free of impurities such as water, oxygen and carbon dioxide. In this connection it is desirable to remove the air and moisture from the reaction vessel in which the polymerization is conducted. Although it is preferred to carry out the polymerization under anhydrous or substantially anhydrous conditions, it is to be understood that some small amounts of these catalyst-inactivating materials can be tolerated in the reaction mixture. However it is also to be understood that the amount of such materials which can be tolerated is insufficient to cause complete deactivation of the catalyst.

At the completion of the polymerization reaction, the total reaction mixture is then treated to inactivate the catalyst and to precipitate the polymer. Any suitable method can be utilized for carrying out this treatment of the reaction mixture. In one suitable method, the catalyst-inactivating agent, such as water or an alcohol, is added to the mixture so as to inactivate the catalyst and cause precipitation of the polymer. The polymer is then separated from the alcohol or water and diluent by any suitable means such as decantation or filtration. It is often preferred to add initially only an amount of the catalyst-inactivating agent which is sufficient to inactivate the catalyst without causing precipitation of the dissolved polymer. It has also been found advantageous to add an antioxidant, such as 2,6-di-t-butyl-4-methylphenol, to the polymer mixture prior to precipitation of the polymer. After addition of the catalyst-inactivating agent and the antioxidant, the polymer present in the solution can then be separated by the addition of an excess of an agent such as ethyl alcohol or isopropyl alcohol. When an alcohol is used as a catalyst-inactivating agent, it also functions to precipitate the polymer. In the event other catalyst-inactivating agents are employed, which do not perform this dual role, a suitable agent, such as an alcohol can be added to precipitate the polymer. It is, of course, to be realized that it is within the scope of the invention to employ other suitable means to recover the polymer from solution. After separation from the solvent mixture and alcohol by filtration or other suitable means, the polymer is dried.

The copolymers described above can be hydrogenated by various methods well known in the art. The hydrogenated copolymers of the present invention generally have an increased softening temperature as compared to the corresponding unhydrogenated copolymer. The increase in softening temperature is conveniently measured as the Vicat softening point.

Normally, at least about 65 percent of the olefinic unsaturation of the inventive copolymer is removed by hydrogenation in order to achieve a substantial increase in softening point; however, it is understood that copolymers with any portion of the olefinic unsaturation hydrogenated are within the scope of the invention. Also, in instances where the unhydrogenated copolymer contains styrene units, as previously discussed, removal of such aromatic unsaturation to any degree is within the scope of the copolymers of the present invention.

Although a number of hydrogenation processes are well known in the art which can be used in accordance with the present invention, and thus the present invention it not limited thereby, one such suitable process is described below.

An unsaturated copolymer as previously described and prepared in accordance with the invention is charged, in a condition substantially free of salts or other materials which might act as hydrogenation catalyst poisons, to a suitable hydrogenation reactor, said polymer being in the form of a solution or dispersion in a suitable solvent. In some instances the polymer dissolves completely, while in other instances a dispersion is formed. The solvent or dispersant is preferably inert to the hydrogenation reaction and to the other compounds present. Suitable solvents include saturated cyclic hydrocarbons such as cyclohexane, methylcyclohexane, decalin and the like. Aromatic hydrocarbons, such as benzene and toluene; cyclic ethers, such as dioxane; and paraffinic hydrocarbons such as isooctane, isoheptane, and normal heptane; hydroaromatic hydrocarbons such as tetralin; and the like, can also be used. Mixtures of solvents and/or dispersants can be employed if desired. The polymer concentration in the solvent or dispersant can vary over a relatively wide range, and can be as low as 1 weight percent although concentrations of about 5 to 25 weight percent are preferred.

In one embodiment, after the polymer has been dissolved in the solvent the hydrogenation catalyst is added, hydrogen is added, and the temperature raised to a suitable level for hydrogenation. This operation can be carried out in a batchwise or in a continuous manner.

One catalyst system which can be used employs two components, one being a reducing metal compound which can be represented by the formula $MR_n^{IV}$ wherein M represents a metal of Group I-A, II-A, or III-A of the Periodic System as shown on page B-2 of the Handbook of Chemistry and Physics, 45th Edition, published by The Chemical Rubber Company in 1964, n is the valence of the metal M and each $R^{IV}$ is hydrogen or a hydrocarbyl radical having 1-20 carbon atoms such as alkyl, cycloalkyl, aryl or combinations thereof. Typical compounds representative of this component for the catalyst system include triisobutylaluminum, triethylaluminum, trieicosylaluminum, dicyclohexyl (phenyl)aluminum, 1-anthracenylpotassium, di-3-phenanthrylberyllium, n-butyllithium, dimethylmagnesium, di-n-propylbarium, tri-n-pentylgallium, diisobutylaluminum hydride, sodium hydride, aluminum hydride, and the like.

The second component of the catalyst system is a metal salt having the formula

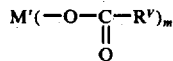

in which M' is a Group VIII metal of the above-referenced Periodic System; $R^V$ has the same meaning as in the formula for the first component; and m is the valence of M'. The second component is preferably a nickel salt. Typical compounds are nickel stearate, nickel acetate, nickel propionate, nickel formate, nickel octoate, nickel benzoate, nickel naphthenate, and the corresponding iron, cobalt, palladium, and platinum salts such as ferric stearate, cobalt naphthenate, cobalt octoate, and the like. Of this group nickel stearate, nickel octoate, and nickel naphthenate are the presently preferred compounds.

It is preferred to use the nickel salts of organic acids having 5-20 carbon atoms, preferably branched, because they are more readily soluble in the treating mixture. Lower molecular weight acid salts, however, such as nickel acetate can be used and one method of improving the physical form of such materials for use in the process is to grind the nickel acetate with mineral oil to form a very fine slurry prior to combining it with the reducing metal compound.

The hydrogenation catalysts are generally prepared by mixing the components in a solvent, for example the hydrocarbon solvent to be used for the treating medium. Catalyst poisons such as oxygen, water or the like should be avoided. The ratio of the reducing metal component to the Group VIII metal compound varies widely. On a molar basis it is generally in the range of 0.1 to 10; however good results are obtained employing a molar ratio in the range of about 0.5 to 5 moles per mole. The concentration of the catalyst in the reaction mixture can also vary widely; it is generally in the range of 0.001 to 10 weight percent based on the polymer; however, good results are obtained employing a concentration in the range of 0.002 to 5 weight percent. Greater or lesser amounts of catalyst can, however, be used.

To hydrogenate at least a portion of the olefinic unsaturation, the polymer, generally in solution, is contacted with the hydrogenation catalyst under conditions which include temperatures in the range of about 10° to about 250° C and pressures up to about 1000 psig. The reaction time can vary from 1 minute to about 25 hours or more. Good results are obtained employing temperatures in the range of about 75° to about 200° C, pressures in the range of about 10 to about 500 psig and reaction times in the range of about 10 minutes to about 10 hours. When treating the polymer in solution the pressure is usually that sufficient to maintain reaction mixture substantially in the liquid phase.

To hydrogenate at least a portion of the aromatic unsaturation in addition to the olefinic unsaturation in instances where the polymer is made from styrene or derivatives thereof, the polymer, generally in solution, is contacted with the catalyst under conditions which include temperatures in the range of from about 10° to about 250° C, pressures up to about 3000 psig and reaction times in the range of from about 10 minutes to about 40 hours or more. Good results are obtained employing conditions which include temperatures in the range of from about 75° to about 200° C, pressures in the range of from about 100 to about 1500 psig, and reaction times in the range of from about 1 hour to about 20 hours.

In accordance with the invention, hydrogenated copolymers have been produced with essentially all the olefinic unsaturation hydrogenated and as much as 90 percent of the aromatic unsaturation hydrogenated. Such hydrogenated copolymers show a substantial increase in their Vicat temperatures as compared to the unhydrogenated copolymers. Further, these hydrogenated copolymers have well-developed resinous characteristics.

Upon the effective completion of the hydrogenation reaction, the hydrogenated polymer can be isolated by simple, well-known techniques. For example, the catalyst components can be converted to water-soluble salts and washed from the polymer solution. The polymer solution can then be dried, and an antioxidant added if desired, and the polymer isolated by evaporation of the solvent.

The hydrogenated and unhydrogenated copolymers made in accordance with this invention are suitable for such uses as shoe soles, rubber bands, adhesives, cove base floor tile, and various molded or extruded articles. In addition the hydrogenated and unhydrogenated copolymers can be compounded with stabilizers, antioxidants, fillers, pigments, reinforcing agents and other such additives as may be required.

EXAMPLES

The polymerizations were carried out under nitrogen in capped beverage bottles employing anhydrous reactants and conditions. The charge order was: diluent, monomers, ether (when employed), and initiator. The bottles were tumbled in a constant temperature bath for the stipulated polymerization times and at the stipulated temperatures. Following polymerization, 2,6-di-t-butyl-4-methylphenol (one part by weight per hundred parts by weight of total monomer) was added in a 50/50 volume toluene/isopropyl alcohol solution, the polymer solutions were filtered, and the polymers were coagulated by adding the filtrates to isopropyl alcohol. The polymers were then collected by filtration and dried under reduced pressure. Abbreviations employed in the following examples are:

| | |
|---|---|
| THF | tetrahydrofuran |
| Sty | styrene |
| CHD | 1,3-cyclohexadiene |
| Bd | 1,3-butadiene |
| DiLi-3 | difunctional lithium catalyst, principally 1,3-bis(1-lithio-3-methylphenyl)benzene, as described herein and in Bulletin 192, Lithium Corporation of America, subsidiary of Gulf Resources and Chemical Corp., Bessemer City, N. Carolina, 28016. |
| phm | parts by weight per hundred parts by weight monomer |
| mhm | gram millimoles per hundred grams monomer |
| meqhm | milliequivalents per hundred grams monomer |
| IV | inherent viscosity |
| $M_n$ and $M_w$ | number average molecular weight and weight average molecular weight, respectively, each determined by gel permeation chromatography in accordance with G. Kraus and C. J. Stacy, J. Poly. Sci. A-2, 10, 657 (1972). |
| HI | Heterogeneity index: the quotient of the weight average molecular weight divided by the number average molecular weight. |

Also inherent viscosity (IV) and gel content were determined in accordance with Notes (a) and (b) respectively in U.S. Pat. No. 3,278,508, column 20, with the modification that tetrahydrofuran was used in place of toluene and with the further modification that the solution was not filtered through a sulfur absorption tube but rather a sample of the solution was filtered through a fritted filter stick of grade C porosity and pressured directy into the viscometer. Styrene content, as weight percent styrene, was determined by ultraviolet absorption spectroscopy. Trans content and vinyl content of the acyclic conjugated diene units, each in weight percent of the copolymer, were determined by infrared absorption spectroscopy. Vibron temperature scans, that is, temperature scans of the dynamic viscoelastic properties, were obtained employing a Vibron Direct Reading Viscoelastometer, Toyo Measuring Instruments Co., Ltd., Tokyo, Japan. In the following tabulated data a dash (-) indicates that no determination was made.

EXAMPLES 1–15

Examples 1–15 reflect the effects of variations in the general composition of the comonomer mixture and in the tetrahydrofuran level. These runs were made in accordance with the following recipe.

| Recipe | |
|---|---|
| | phm |
| Cyclohexane | 700 |
| 1,3-Butadiene | variable |
| Styrene | variable |
| 1,3-Cyclohexadiene | variable |
| Tetrahydrofuran | variable |
| DiLi-3 | 3.2 meqhm |
| Temperature, ° F | 122 |
| Time, hours | 16 |
| The charge data and results are shown in Table I. | |

TABLE I

| Ex. No. | Bd phm | Sty phm | CHD phm | THF phm | Conversion Weight % | Green Tensile psig[1] | IV[3] | HI | $M_w \times 10^{-3} / M_n \times 10^{-3}$ | Sty Wt. % | Vinyl Wt. % | Trans Wt. % | Unsat.[4] mm/g |
|---|---|---|---|---|---|---|---|---|---|---|---|---|---|
| 1 | 0 | 50 | 50 | 5 | 60 | — | 0.59 | 2.7 | 113/42 | 86.2 | — | — | — |
| 2 | 0 | 50 | 50 | 5 | 75 | — | 0.66 | 1.78 | 96/54 | 65.2 | — | — | — |
| 3 | 20 | 40 | 40 | 5 | 78 | 1550 | 0.91 | 2.2 | 120/55 | 57.1 | — | 8.8 | — |
| 4 | 0 | 70 | 30 | 5 | 95 | — | 0.65 | 1.97 | 142/72 | 56.3 | — | — | — |
| 5 | 0 | 30 | 70 | 5 | 55 | — | 0.52 | 1.96 | 86/44 | 56.6 | — | — | — |
| 6 | 10 | 45 | 45 | 5 | 75 | — | 0.69 | 2.0 | 102/51 | 58.2 | — | — | — |
| 7 | 60 | 20 | 20 | 5 | 100 | 145 | 1.20 | 1.71 | 143/84 | 20.2 | 29.3 | 18.3 | 1.30 |
| 8 | 80 | 10 | 10 | 5 | 100 | low[2] | 1.29 | 1.71 | 154/90 | 10.0 | 36.9 | 21.9 | 1.51 |
| 9 | 80 | 10 | 10 | 1.7 | 100 | low | 1.36 | 1.74 | 162/93 | 10.4 | 31.2 | 28.9 | 1.53 |
| 10 | 60 | 20 | 20 | 1.7 | 100 | 1500 | 1.16 | 1.73 | 130/75 | 20.1 | 23.4 | 24.9 | 1.26 |
| 11 | 80 | 10 | 10 | 0 | 100 | 140 | 1.26 | 1.82 | 123/68 | 10.4 | 7.1 | 41.5 | 1.56 |
| 12 | 60 | 20 | 20 | 0 | 95 | 550 | 1.05 | 2.1 | 99/48 | 20.5 | 5.8 | 33.2 | 1.36 |
| 13 | 70 | 0 | 30 | 5 | 100 | low | 1.01 | 1.87 | 108/58 | — | 35.2 | 20.1 | 1.57 |
| 14 | 70 | 0 | 30 | 1.7 | 100 | low | 1.06 | 2.0 | 102/51 | — | 27.9 | 25.0 | 1.61 |
| 15 | 70 | 0 | 30 | 0 | 90 | low | 1.13 | 2.3 | 94/40 | — | 7.0 | 41.0 | 1.71 |

[1]Tensile strength of unvulcanized sample
[2]Value too low for definitive measurement
[3]All samples were gel-free
[4]Unsaturation as carbon-carbon double bond millimoles per gram polymer The data in Table I illustrate the operability of the invention with various monomer charge ratios and ether levels. In Examples 7 through 15 a substantial percentage by weight of the 1,3-butadiene units of the copolymer was in the trans and vinyl configurations. Vibron temperature scans of the polymers from Examples 13, 14 and 15 indicated that the copolymers were block copolymers whether or not tetrahydrofuran was present. Vibron temperature scans of the polymers from Examples 8, 9, 10, 11 and 12 indicated that the 1,3-cyclohexadiene acted as a randomizer for styrene and then added on as a block.

EXAMPLES 16–20

These examples illustrate the effect of variation in only the styrene/cyclohexadiene ratio. These runs were made in accordance with the following recipe.

| Recipe | phm |
|---|---|
| Cyclohexane | 780 |
| 1,3-Butadiene | 60 |
| Styrene | variable |
| 1,3-Cyclohexadiene | variable |
| DiLi-3 | 6.3 meqhm |
| Tetrahydrofuran | 1.5 |
| Temperature, °F | 86 |
| Time, hours | 16 |

The charge data and results are shown in Table II.

TABLE II

| Ex. No. | Bd phm | Sty phm | CHD phm | Conversion, Wt. % | IV | Gel Wt. % |
|---|---|---|---|---|---|---|
| 16 | 60 | 40 | 0 | 100 | 0.88 | 0 |
| 17 | 60 | 30 | 10 | 100 | 0.87 | 0 |
| 18 | 60 | 20 | 20 | 100 | 0.85 | 0 |
| 19 | 60 | 10 | 30 | 100 | 0.87 | 0 |
| 20 | 60 | 0 | 40 | 100 | 0.82 | 0 |

The above data, especially in view of the effective quantitative conversion, shows a wide range of operable variability in styrene/1,3-cyclohexadiene charge ratios.

EXAMPLES 21–30

A series of runs was made to determine the effect upon conversion of variation of styrene/1,3-cyclohexadiene charge ratios and of the presence or absence of an ether. This series was made in accordance with the following recipe.

| Recipe | phm |
|---|---|
| Cyclohexane | 780 |
| 1,3-Butadiene | 60 |
| Styrene | variable |
| 1,3-Cyclohexadiene | variable |
| Tetrahydrofuran | 0 or 1.5 |
| DiLi-3 | variable |
| Temperature, °F | 86 |
| Time, hours | 16 |

The charge data and results are shown in Table III

TABLE III

| Ex. No. | Bd phm | Sty phm | CHD phm | THF phm | DiLi-3 meqhm | Conversion, Wt. % |
|---|---|---|---|---|---|---|
| 21 | 60 | 30 | 10 | 0 | 5.6 | 97 |
| 22 | 60 | 30 | 10 | 0 | 6.3 | 96 |
| 23 | 60 | 20 | 20 | 0 | 5.6 | 88 |
| 24 | 60 | 20 | 20 | 0 | 6.3 | 88 |
| 25 | 60 | 30 | 10 | 1.5 | 5.6 | 100 |
| 26 | 60 | 30 | 10 | 1.5 | 6.3 | 100 |
| 27 | 60 | 20 | 20 | 1.5 | 5.6 | 100 |
| 28 | 60 | 20 | 20 | 1.5 | 6.3 | 100 |
| 29 | 60 | 0 | 40 | 0 | 5.6 | 54 |
| 30 | 60 | 0 | 40 | 1.5 | 5.6 | 97 |

From these data and under these conditions, it is apparent that higher conversion is obtained when tetrahydrofuran is present and that the invention is operable with various styrene/1,3-cyclohexadiene charge ratios.

EXAMPLES 31–32

Two runs were made, one with tetrahydrofuran and one without, wherein 1,3-butadiene and 1,3-cyclohexadiene were charged as comonomers. Samples were taken for analysis at intervals as shown in Table IV. The recipe employed is given below.

| Recipe | phm | mhm |
|---|---|---|
| Cyclohexane | 780 | |
| 1,3-Butadiene | 75 | |
| 1,3-Cyclohexadiene | 25 | |
| Tetrahydrofuran | 0 or 2 | |
| sec-Butyllithium | | 3 |
| Temperature, °F | 122 | |
| Time | variable | |

Table IV indicates the polymerization data and results

TABLE IV

| Ex. No. | Sample No. | Polymerization Time, Min. | THF phm | Conversion, Wt. % |
|---|---|---|---|---|
| 31 | 1 | 12 | 0 | 19.1 |

-continued

| | | Recipe | | |
|---|---|---|---|---|
| | | | phm | mhm |
| 31 | 2 | 21 | 0 | 29.8 |
| 31 | 3 | 29 | 0 | 39.9 |
| 31 | 4 | 40 | 0 | 48.2 |
| 31 | 5 | 60 | 0 | 59.0 |
| 31 | 6 | 90 | 0 | 67.7 |
| 31 | 7 | (1) | 0 | 94.0 |
| 32 | 1 | 4 | 2 | 19.3 |
| 32 | 2 | 8 | 2 | 35.7 |
| 32 | 3 | 12.5 | 2 | 45.6 |
| 32 | 4 | 20.5 | 2 | 62.7 |
| 32 | 5 | 36 | 2 | 74.0 |
| 32 | 6 | 50 | 2 | 78.2 |
| 32 | 7 | (1) | 2 | 99.0 |

(1) Approximately 16 hours.

The above data clearly establish that the presence of tetrahydrofuran increases the polymerization rate of these monomers under these conditions.

EXAMPLES 33-36

A series of runs was made in accordance with the following recipe using a tertiary amine in lieu of an ether.

| Recipe | phm |
|---|---|
| Cyclohexane | 780 |
| 1,3-Butadiene | 60 |
| 1,3-Cyclohexadiene | 40 |
| Tetrahydrofuran (THF) | variable |
| N,N,N',N'-Tetramethylethylenediamine (TMED) | variable |
| DiLi-3 | 1.4 meqhm |
| Temperature | 30° C (86° F) |
| Time, hours | 16 |

The charge data and results are tabulated below

TABLE V

| Example No. | Compound | phm | Conversion Weight % |
|---|---|---|---|
| 33 | None | 0 | 51.5 |
| 34 | THF | 2 | 86.5 |
| 35 | TMED | 0.2 | 91.5 |
| 36 | TMED | 2 | —(a) |

(a) Not determined since polymer had gelled but conversion was estimated to be at least as high as in Run 3.

The above data reflect the high effectiveness of N,N,N',N'-tetramethylethylenediamine, a tertiary amine, to increase the polymerization rate of these monomers under these conditions.

EXAMPLES 37-42

A series of runs was made in accordance with the following recipe.

| Recipe | pbm | meqhm |
|---|---|---|
| Cyclohexane | 546 | |
| Styrene | variable | |
| 1,3-Butadiene | variable | |
| 1,3-Cyclohexadiene | 40 | |
| Tetrahydrofuran | 2 | |
| DiLi-3 | | 6.4 |
| Temperature, ° C | 30 | |
| Time, hours | 16 | |

Samples 37, 39 and 41 were treated with 1 phm 2,6-di-t-butyl-4-methylphenol in a toluene-isopropyl alcohol solution, the polymers were coagulated by addition of sufficient isopropyl alcohol, collected by filtration and solvent traces were stripped at reduced pressure.

Samples 38, 40 and 42 were hydrogenated at 70° C and 85 psig hydrogen employing 10 mhm of nickel (charged as 10 mhm nickel octoate in the presence of 10 mhm triethylaluminum). Hydrogenation was continued for approximately 6 hrs., i.e. to effective completion. The polymer solutions after hydrogenation were mixed with water to destroy the triethylaluminum and were aeriated to oxidize the nickel. They were then treated with a mixture of phosphoric acid and ammonium phosphate to form the respective metal phosphates. Then 1 phm 2,6-di-t-butyl-4-methylphenol in toluene-isopropyl alcohol solution was added and, in each case, the organic phase was then mixed isopropyl alcohol to coagulate the polymer. The polymer was separated by filtration and solvent traces were removed under reduced pressure.

The properties determined for the hydrogenated polymers are tabulated below with those of the corresponding unhydrogenated polymers.

Table VI

| | Recipe Values | | Conversion to Unsaturated | | Polymer Properties | | | | | |
|---|---|---|---|---|---|---|---|---|---|---|
| Run No. | Styrene pbm | Butadiene pbm | Polymer Wt. % | Polymer Hydrogenated | I.V. | Wt. % Insoluble[1] | 10 × Melt Flow[2] | Flexural Modulus psig × 10$^{-3}$[3] | Elongation %[4] | Tensile psig %[4] | Vicat Temp. ° C[5] |
| 37 | 55 | 5 | 100 | no | 0.60 | 0 | 3.05 | 366 | 4 | 6110 | 89 |
| 38 | 55 | 5 | 100 | yes | 0.89 | 37 | 0.07 | 348 | 4 | 6120 | 105 |
| 39 | 50 | 10 | 100 | no | 0.70 | 0 | 3.20 | 328 | 5 | 5730 | 83 |
| 40 | 50 | 10 | 100 | yes | 1.04 | 18 | 0.03 | 299 | 7 | 5900 | 96 |
| 41 | 40 | 20 | 100 | no | 0.73 | 0 | 2.34 | 23 | 304 | 2810 | 66 |
| 42 | 40 | 20 | 100 | yes | 0.75 | 54 | 0.04 | 85 | 296 | 4420 | 82 |

[1] Weight percent of polymer that was insoluble in tetrahydrofuran at 27° C.
[2] Melt flow: g./10 min. at 200° C/21.6 Kg weight determined in accordance with ASTM D 1238.
[3] ASTM D 790-63.
[4] Percent elongation and tensile strength were determined in accordance with ASTM D 412-66.
[5] ASTM D 1525-58 T The value of hydrogenation in elevating the polymer softening points is clearly evident by comparing the Vicat temperature values of the hydrogenated polymers with those of the corresponding unsaturated polymers, i.e., run 38 vs. 37, 40 vs. 39, and 42 vs. 41.

EXAMPLE 43-48

Following the general procedure of Examples 37-42, with modifications as indicated below, additional runs were made in accordance with the following recipe. The results obtained are tabulated below.

| Recipe | | |
|---|---|---|
| | phm | meqhm |
| Cyclohexane | 546 | |
| Styrene | variable | |
| 1,3-Butadiene | variable | |
| 1,3-Cyclohexane | 40 | |
| Tetrahydrofuran | 0.8 | |
| DiLi-3 | | 6.0 |
| Temperature, °C | 30 | |
| Time, hours | 16 | |

The polymer solutions were treated with a toluene-isopropyl alcohol solution containing 1 phm of 2,6-di-t-butyl-4-methylphenol, the polymers were coagulated by treatment with isopropyl alcohol, the polymer samples were collected by filtration and solvent traces were removed at reduced pressure. Polymers of runs 44, 46 and 48 were hydrogenated in toluene solution at 70° C at approximately 85 psig hydrogen in about 6.5 hours employing 5 mhm of nickel charged as 5 mhm nickel octoate in the presence of 10 mhm triethylaluminum. Following polymer isolation in accordance with Examples 37–42 above, polymer properties — for both hydrogenated and unhydrogenated samples — were determined. The results are tabulated below.

| Recipe | | |
|---|---|---|
| | phm | meqhm |
| Time, hours | 16 | |

The polymer cement produced from the above recipe was diluted with 195 parts additional cyclohexane and methanol was added to terminate the living polymer. A mixture of triethylaluminum and nickel octoate in a 2Al/Ni atom ratio and affording 16 mhm nickel was added in cyclohexane. Hydrogenation of this mixture was carried out in a stirred reactor at temperatures ranging from about 75° to about 152° C and at pressures ranging from about 200 to about 900 psig hydrogen for 7 hours. The resinous hydrogenated polymer was recovered by the procedure described previously for olefinic hydrogenations. The residual or unhydrogenated styrene content, determined by ultraviolet absorption spectroscopy, was 7.2 percent. The copolymer thus produced had essentially all the olefinic unsaturation and at least 90 percent of the aromatic unsaturation hydrogenated.

TABLE VII

| Run No. | Recipe Values | | Polymer Wt. % | Conversion to Unsaturated Polymer Hydrogenated? | I.V. | Gel Wt. % | 10 × Melt Flow | Polymer Properties | | | | |
|---|---|---|---|---|---|---|---|---|---|---|---|---|
| | Styrene phm | Butadiene phm | | | | | | Flexural Modulus psig × 10⁻³ | Tensile Yield psig[1] | Tensile Break psig[2] | Elongation %[2] | Vicat Temp. °C |
| 43 | 55 | 5 | 100 | no | 0.67 | 0 | 15.9 | 383 | | 6070 | 4 | 93 |
| 44 | 55 | 5 | 100 | yes | 0.68 | 0 | 5.59 | 338 | | 7420 | 8 | 90 |
| 45 | 50 | 10 | 100 | no | 0.71 | 0 | 9.41 | 307 | 5910 | | 5,5,36 | 84 |
| 46 | 50 | 10 | 100 | yes | 0.74 | 0 | 2.19 | 256 | 5710 | | 11,75 101 | 94 |
| 47 | 40 | 20 | 100 | no | 0.76 | 0 | 6.98 | 25 | | 2640 | 380 | 70 |
| 48 | 40 | 20 | 100 | yes | 0.83 | 0 | 1.05 | 45 | | 3710 | 542,450, 110 | |

[1]ASTM D 412–66. Tensile break is reported for specimens which broke before the tensile yield point was reached.
[2]Three measurements were made, respectively, for samples from runs 45, 46 and 48.

Again, as in Examples 37–42, a comparison of the Vicat temperatures for the respective hydrogenated sample (the even-numbered run of each pair) with the nonhydrogenated counterpart, i.e., run 44 vs. 43, 46 vs. 45 and 48 vs. 47, it is seen that hydrogenation normally raises the polymer softening point. The relationship between the Vicat values for runs 43 and 44 indicates the Vicat value for run 44 is clearly anamalous.

EXAMPLE 49

A cyclohexadiene/butadiene/styrene copolymer was synthesized in accordance with the following recipe and subsequently hydrogenated to remove the olefinic and aromatic unsaturation. The recipe components are listed in the order charged. The polymerization was carried out following the general procedure employed in Examples 37–48.

| Recipe | | |
|---|---|---|
| | phm | meqhm |
| Cyclohexane | 546 | |
| Styrene | 50 | |
| 1,3-Butadiene | 10 | |
| 1,3-Cyclohexadiene | 40 | |
| Tetrahydrofuran | 0.8 | |
| DiLi-3 | | 6.0 |
| Temperature, °C | 30 | |

| Polymer Properties | |
|---|---|
| 10 × Melt flow (g./10 min. at 200° C/21.6 Kg weight) | 2.63 |
| Flexural modulus, psig × 10⁻³ | 355 |
| Tensile break, psi | 3420 |
| Elongation, % | 3 |
| Vicat Temperature | 104.4° F |

The following comparison shows the effect of hydrogenation upon Vicat temperature of copolymers of the invention.

| | Unhydrogenated | Olefinic Hydrogenation | Olefinic plus Aromatic Hydrogenation |
|---|---|---|---|
| Example No. | 45 | 46 | 49 |
| Vicat, °C | 84 | 94 | 104.4 |

What is claimed is:
1. A method for the production of a copolymer by polymerizing a monomer mixture consisting essentially of
   1,3-butadiene;
   a 1,3-cyclodiene represented by the general formulas

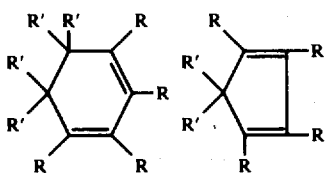

wherein R is selected from the group consisting of hydrogen, methyl and ethyl radicals, R' is selected from the group consisting of hydrogen, cycloalkyl, aryl and linear and branced alkyl radicals such that the maximum number of carbon atoms per R' radical is about 6 and the total number of carbon atoms per cyclodiene monomer is in the range of from about 5 to 20;

an organolithium initiator consisting of alpha-lithio multisubstituted dialkylbenzenes and dialkylbenzene oligomers represented by the general formula

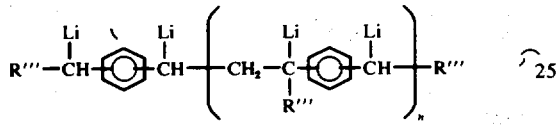

wherein R''' is a linear or branched alkyl containing 2 to 12 carbon atoms, and n is an integer from 0 to 2;
optionally a vinylaromatic compound containing in the range of from about 8 to 14 carbon atoms per molecule;
optionally an ether or tertiary amine in an amount in the range of from about 0.01 to 50 parts by weight per 100 parts by weight monomer; and
optionally a hydrocarbon diluent which is not detrimental to said polymerization.

2. The method of claim 1 wherein said polymerization is carried out at a temperature in the range of from about 0° to 300° F.

3. The method of claim 2 wherein said temperature is in the range of from about 30° to 150° F and said diluent is a cycloparaffin.

4. The method of claim 1 wherein said ether is tetrahydrofuran or N,N,N', N'-tetramethylethylenediamine and the amount is in the range of from about 0.1 to 10 parts by weight per hundred parts by weight monomer.

5. The method of claim 1 wherein the weight ratio of 1,3-butadiene units to 1,3-cyclodiene units in the copolymer is in the range of from about 99:1 to 1:99;
wherein the amount of organolithium initiator is in the range of from about 0.1 to 100 millimoles per hundred grams monomer; and
wherein the copolymer produced is a block copolymer.

6. The method of claim 5 wherein said weight ratio is in the range of from about 95:5 to 40:60.

7. The method of claim 1 wherein the weight ratio of 1,3-butadiene units to vinylaromatic compound units in the copolymer is in the range of from about 100:0 to 1:99 and the copolymer produced is a block copolymer.

8. The method of claim 7 wherein the weight ratio is in the range of from about 100:0 to 50:50.

9. The method of claim 1 wherein the 1,3-cyclodiene is 1,3-cyclohexadiene and the organolithium initiator is principally 1,3-bis(1-lithio-3-methylpentyl)benzene or secbutyllithium.

10. The method of claim 1 wherein the vinylaromatic compound is styrene.

11. The method of claim 1 further comprising passing the copolymer produced by said polymerization to a hydrogenation zone wherein a portion of the olefinic unsaturation of said copolymer is hydrogenated in the presence of a suitable catalyst.

12. The method of claim 11 wherein at least 65 percent of the olefinic unsaturation of said copolymer is hydrogenated.

13. The method of claim 11 wherein at least 90 percent of the aromatic unsaturation is hydrogenated.

14. A copolymer consisting essentially of
units of 1,3-butadiene;
units of a 1,3-cyclodiene represented by the general formulas

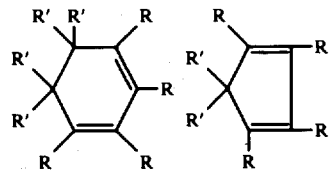

wherein R is selected from the group consisting of hydrogen, methyl and ethyl radicals, R' is selected from the group consisting of hydrogen, cycloalkyl, aryl and linear and branched alkyl radicals such that the maximum number of carbon atoms per R' radical is about 6 and the total number of carbon atoms per cyclodiene monomer is in the range of from about 5 to 20;
optionally units of a vinylaromatic compound containing in the range of from about 8 to 14 carbon atoms per molecule; and
wherein the 1,3-butadiene portion of said copolymer has a trans and vinyl content ranging from about 48 to 99 percent when said copolymer does not contain units of said vinylaromatic compound and 39 to 99 percent when said copolymer does contain units of said vinylaromatic compound.

15. The copolymers of claim 14 wherein the weight ratio of 1,3-butadiene units to 1,3-cyclodiene units is in the range of from about 99:1 to 1:99.

16. The copolymer of claim 15 wherein the weight ratio of 1,3-butadiene units to 1,3-cyclodiene units is in the range of from about 95:5 to 40:60.

17. The copolymer of claim 16 wherein the 1,3-cyclodiene is 1,3-cyclohexadiene.

18. The copolymer of claim 14 wherein the vinyl aromatic compound is styrene, and the weight ratio of 1,3-butadiene units to styrene units is in the range of from about 100:0 to 50:50.

19. The copolymer of claim 14 containing olefinic unsaturation of which a portion is removed by hydrogenation.

20. The copolymer of claim 19 wherein at least 65 percent of the olefinic unsaturation is hydrogenated.

21. The copolymer of claim 14 wherein at least 90 percent of the aromatic unsaturation is hydrogenated.

* * * * *